US005839390A

United States Patent [19]
Meads

[11] Patent Number: 5,839,390
[45] **Date of Patent: *Nov. 24, 1998**

[54] RIDING INDICATOR

[75] Inventor: Barbara Helen Meads, Melton, United Kingdom

[73] Assignee: Janssen Pharmaceutica, N.V., Beerse, Belgium

[ * ] Notice: This patent issued on a continued prosecution application filed under 37 CFR 1.53(d), and is subject to the twenty year patent term provisions of 35 U.S.C. 154(a)(2).

[21] Appl. No.: 624,452

[22] PCT Filed: Oct. 26, 1994

[86] PCT No.: PCT/EP94/03511

§ 371 Date: Apr. 4, 1996

§ 102(e) Date: Apr. 4, 1996

[87] PCT Pub. No.: WO95/12366

PCT Pub. Date: May 11, 1995

[30] Foreign Application Priority Data

Oct. 30, 1993 [GB] United Kingdom .................... 9322414

[51] Int. Cl.[6] .................... A01K 29/00
[52] U.S. Cl. .................... 119/174; 600/551
[58] Field of Search .................... 128/738; 119/174, 119/823; 600/551

[56] References Cited

U.S. PATENT DOCUMENTS

| | | | |
|---|---|---|---|
| 3,076,431 | 2/1963 | Rule et al. . | |
| 3,205,857 | 9/1965 | Larson | 128/738 |
| 3,842,802 | 10/1974 | Lang et al. | 128/738 |
| 3,942,475 | 3/1976 | Wassilieff et al. | 128/738 |
| 4,206,766 | 6/1980 | Bielka . | |
| 4,563,980 | 1/1986 | Thompson | 128/738 |
| 4,685,421 | 8/1987 | Colburn | 128/738 |
| 4,696,258 | 9/1987 | Magrath et al. | 128/738 |
| 4,846,106 | 7/1989 | Leonardo | 600/551 |
| 4,895,165 | 1/1990 | Blair | 600/551 |

FOREIGN PATENT DOCUMENTS

| | | | |
|---|---|---|---|
| 628909 | 10/1978 | U.S.S.R. | 128/738 |
| 2097236 | 11/1982 | United Kingdom | 119/174 |

*Primary Examiner*—Mark O. Polutta
*Attorney, Agent, or Firm*—Ellen Ciambrone Coletti

[57] ABSTRACT

A method and apparatus for indicating when a female stock animal has been ridden or mounted by another stock animal comprises providing indicator means which is mounted on a female animal to be monitored. The apparatus is directly engaged by the other stock animal during riding or mounting and pressure applied to a smoothly curved actuator causes release of a signalling element to provide a visually observable signal. The device is re-setable by simple manual intervention and can be transferred to another animal after use.

16 Claims, 10 Drawing Sheets

RIDING INDICATOR

CROSS REFERENCE TO RELATED APPLICATIONS

This application is based upon PCT Application Ser. No. PCT/EP 94/03511, filed Oct. 26, 1994, which claims priority from British Patent Application Ser. No. 9322414.5, filed on Oct. 30, 1993.

BACKGROUND OF THE INVENTION

Field of the Invention

This invention relates to a method and apparatus applicable to the monitoring of animals such as stock animals, whereby the monitoring of animal behaviour relevant to artificial insemination is facilitated. The method and apparatus finds application in the indication of oestrus levels in stock and other animals.

Livestock supervision personnel are not always able to determine whether a given animal, such as a cow, is experiencing sexual heat and is thus ready for artificial insemination. However, other animals can do so, and will ride or mount the animal which is in heat.

In the case of a livestock unit with a relatively small number of animals, the stock supervisor can regularly observe all the animals and accordingly can artificially inseminate those which are being ridden. However, in the case of larger live-stock units, mere visual observation of riding or mounting becomes an unreliable parameter for making an insemination decision, because the supervisor will not see all the animals which are being ridden or mounted. Also, it may not be possible to monitor the animals during the night. Failure to artificially inseminate at the correct time leads to a loss of efficiency of the livestock unit.

As a means for mitigating the above problem, it would be possible to employ a dyestuff as an indicator of riding or mounting activity, the dyestuff being applied to the relevant animals prior to such riding or mounting and being transferred to the ridden or mounted animal. However, such a technique is by no means satisfactory in view of its inconvenience of use, potential inefficiency and the uncertainty of the indications given.

Accordingly, there is a need for some alternative means to provide an indication of riding or mounting which will offer improvements in relation to ease of use and/or reliability of indication and/or re-useability and/or improvements generally.

SUMMARY OF THE INVENTION

According to the invention there is provided a method and apparatus for indicating when a female stock or other animal has been ridden by another stock or other animal as defined in the accompanying claims.

In an embodiment there is provided indicator means for application to the female animal and which itself responds to the mounting or riding so as to provide an observable or monitorable response. Thus, by providing the indicator means on the female animal itself the monitoring activity is simplified, whereby only those female animals which it is wished to monitor need be in any way affected or processed by the supervisor.

In an embodiment, the indicator means is in the form of a removable device whereby re-use becomes possible once a particular monitoring activity has been completed.

In the embodiments, the indicator means is responsive to pressure or compression, force or load, or thrust applied to the device during the action of riding or mounting, and has detector means responsive thereto. The detector means is adapted to produce a visible signal by means of a mechanical signalling element which is movable to a signalling position. The signals produced may be achieved by exposing signalling means, for example in a readily visible colour, such exposure being caused by movement of the signalling element.

In the embodiments, the signalling element may be actuated by a mechanical actuator means, which also acts as the detector means.

By providing for detector means responsive to pressure or compression or the like arising during riding or mounting, and by providing also that the detector means serves as an actuator for a signalling element, the advantage is provided that the activity which is to be monitored is arranged itself to generate the necessary signal for monitoring purposes. Thus, the necessary actuation of the signalling element is a direct result of the riding activity.

In the embodiments, the detector means comprises an actuator movable to a raised position in which, in use, it is subjected to said pressure or compression, etc., and is thus caused to actuate the signalling element. The actuator has a smoothly curved profile in its raised position and, in use, is positioned to be physically engaged by the other animal's body, so as to be pressed towards a lowered position, thereby to effect the necessary actuation of the signalling element.

In the embodiments, the actuator is in the form of a flexible element having stiffness, whereby it can generate thrust to actuate the signalling element. The signalling element is directly connected to the actuator. Indeed, in the embodiments, the signalling element comprises the same piece of flexible sheet material as the actuator. The signalling element is movable to its signalling position by resilient means. The resilient means is provided by the resilient nature of a signal structure comprising the signalling element itself. The signal structure is in the form of a piece of flexible sheet material having a flexible hinge portion.

In this way, the combination is provided of a simple and cost effective actuator and detector which is nevertheless capable of reliably generating the necessary thrust to actuate a signalling element. Indeed by providing that element as part of the same piece of sheet material, and utilising the inherent resilience of that sheet material to cause the signalling element to adopt its signalling position, extreme simplicity and economy of construction is achieved in combination with considerable economy in terms of manufacturing cost.

In the embodiments, the arrangement is such that the signalling element can be retained in a non-signalling position in the "cocked" or ready-to-release position of the indicator means, and this is achieved by means of a retaining member for the signalling element, the arrangement being such that actuation of the signalling element releases it from the retaining member. The retaining member itself is in the form of a raisable portion of a base member of the indicator means.

A further feature of the embodiments is that the signalling element, once released, cannot be returned to its retained position by tension applied to it by the actuator means on release thereof, or by repeated actuation of the actuator. Stop means in the form of abutments is provided to define the opposite end positions of the signalling means.

Also in the embodiments, discriminator means is provided to eliminate spurious actuation of the signalling means, except when mounting occurs. The discriminator means comprises resistance or friction means to inhibit accidental actuation of the signalling means.

By use of a retaining member to hold the signalling element in a cocked position, the advantage is provided of ability to release the signalling element relatively rapidly, so that it almost instantaneously adopts its signalling position. Moreover, once released, the signalling element is then reliably able to provide its necessary signal without the possibility of being accidentally returned to its non-signalling position.

A particular feature of the embodiments lies in the ability of the indicated device to have its indicator portion and signalling element movable between two limit positions defined by stop means. Thus, one of the limit positions is a non-signalling position, and the other is a signalling position. The signalling position may employ a releasable signalling element or simply signal by exposing colours or other means to permit visual detection of the signal. By providing stop means to define these positions, the device is readily re-set after use.

BRIEF DESCRIPTION OF THE DRAWINGS

Embodiments of the invention will now be described by way of example with reference to the accompanying drawings in which.

DETAILED DESCRIPTION

Figure 1:
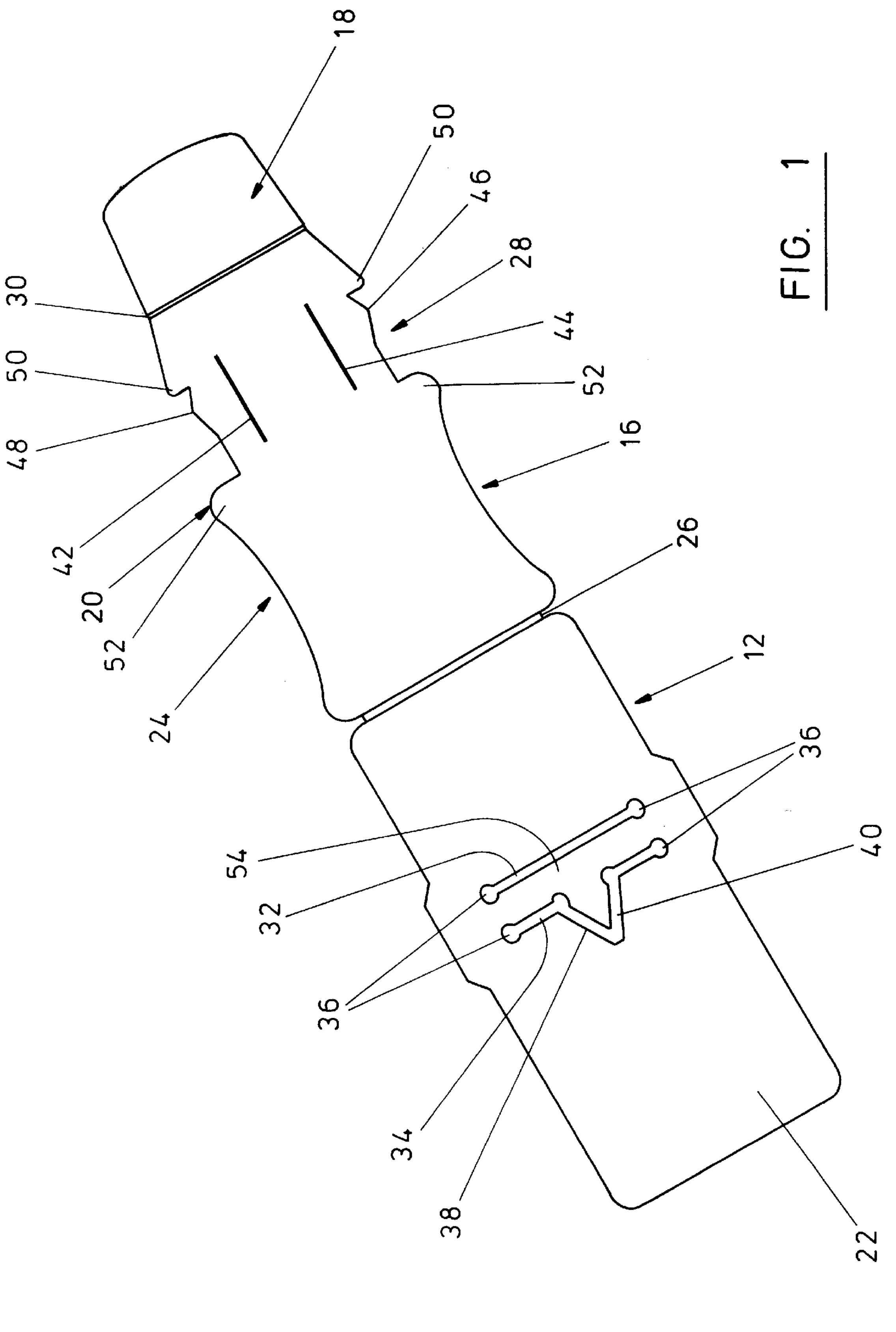
FIG. 1 shows a plan view of a first embodiment of apparatus for indicating.
Figure 2:
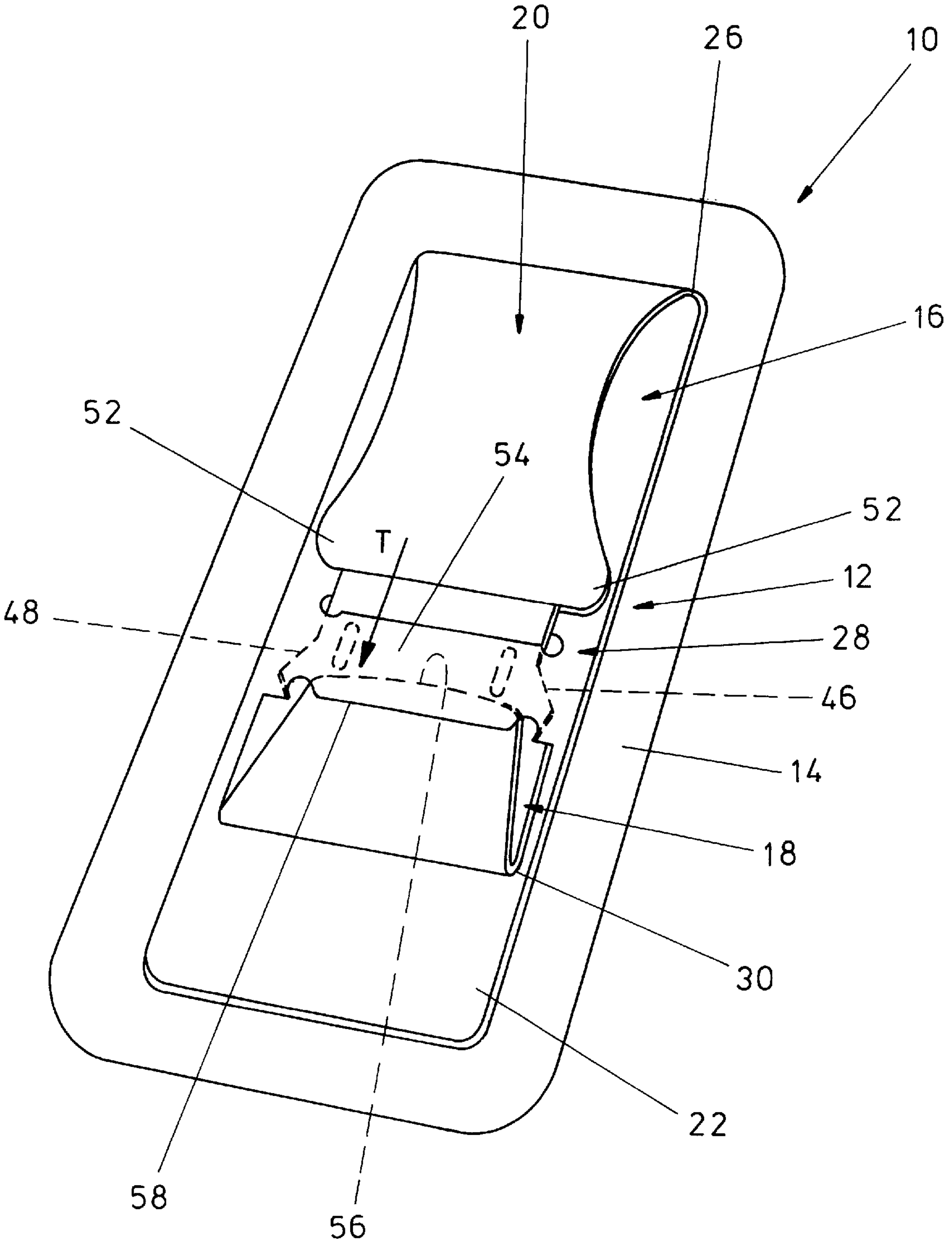
FIG. 2 shows the apparatus of FIG. 1 in assembled condition with an associated sheet for adhering same to an animal, the apparatus being shown in its cocked or ready-to-be-released condition.
Figure 3:
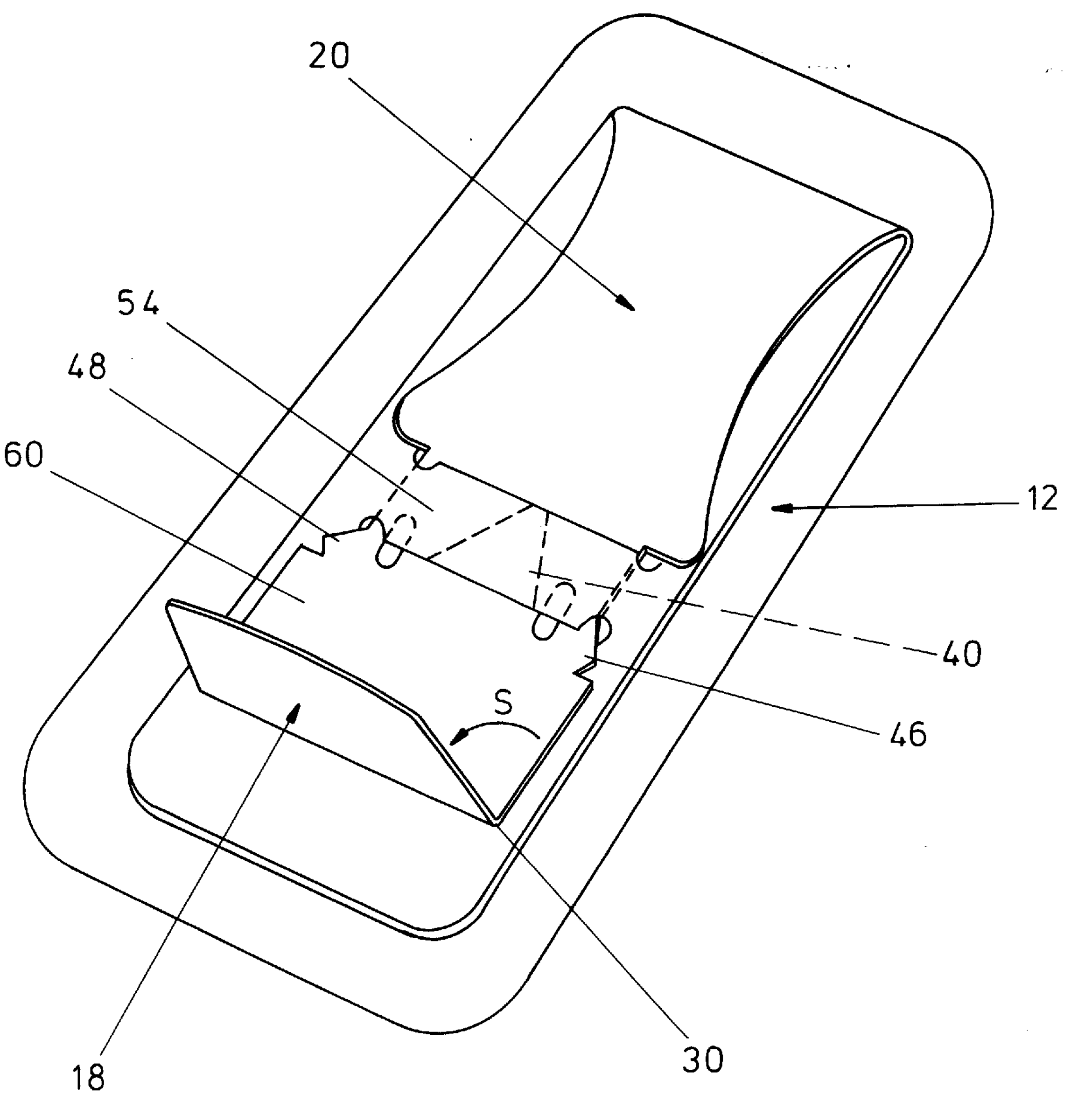
FIG. 3 shows the apparatus of FIG. 2 with signalling means released so that the apparatus is signalling that riding or mounting has occurred.

As shown in FIGS. 1 to 3 of the accompanying drawings, apparatus 10 for indicating when a female stock animal has been ridden by another stock animal comprises indicator means 12. The indicator means is adapted to be mounted on the female stock animal by means of an adhesive sheet 14 (see FIG. 3) to which indicator means 12 is attached and which has adhesive on its lower side for adhering to a selected animal. The adhesive sheet permits the device to be removably mounted on an animal. Alternative attachment means may be adopted for particular circumstances, including the use of round or other shaped sheets 14.

Indicator means 12 comprises detector means 16 responsive to the action of riding or mounting to produce a visible signal in the form of a mechanical signalling element 18 movable to a signalling position by actuator means 20 which also acts as said detector means 16.

Detector means 16 is movable to a raised position seen in FIGS. 2 and 3 in which, in use, it is subjected to the pressure or compression due to the action of mounting or riding and is caused to actuate the signalling element 18.

Actuator 20 has a smoothly curved profile in its raised position, and is in the form of a flexible element having stiffness whereby it can generate thrust to actuate the signalling element 18, which is directly connected to it and indeed is formed as part of the same piece of flexible plastics sheet material from which indicator means 12 is made.

The detailed structure of indicator means 12 can best be seen in FIG. 1. As is shown in FIG. 1, the indicator means is formed as a single piece of flexible plastics sheet material comprising a base portion 22, to which adhesive sheet 14 is secured, as shown in FIG. 2, and an indicator portion 24. Indicator portion 24 is connected to base portion 22 by a hinge portion 26 formed as a reduced thickness part of the plastics sheet material.

Indicator portion 24 of indicator means 12 comprises detector means 16, which is directly connected to hinge portion 26 and a waist portion 28 connecting indicator portion 24 to signalling element 18.

A second hinge 30 connects signalling element 18 with waist portion 28, for a purpose to be described.

Additional features of the indicator means 12 of FIG. 1 include a pair of parallel slots 32, 34 formed in base portion 22 and extending transverse to the longitudinal direction thereof. Each slot is formed with enlarged end openings 36. One of the slots 34 has a centrally-located joggle 38 defining a tongue 40 of V-shaped profile which can be bent back as shown in FIG. 3, for a purpose to be described.

Waist portion 28 is formed with parallel longitudinal slots 42, 44 to permit the waist to be more readily flexed inwardly. The waist itself has outwardly ramped portions 46, 48 between its ends to provide resistance or friction and thus a discriminating effect to eliminate spurious actuation of the signalling means, as described below. Shoulders 50, 52 define the ends of waist 28 and thus constitute stops limiting lengthwise movement of signalling element 18.

As shown in FIG. 1, the relatively narrow strip of material between slots 32, 34 is constructed to provide, in use, a strap or loop 54 which can be raised to receive and allow through it signalling element 18 and shoulders 50 so that waist 28 is located under strap 54. The arrangement is such that the laterally-outwardly projecting ramped or profiled portions 46, 48 frictionally engage the ends of strap 54 so as to exert a frictional damping effect inhibiting movement of signalling element 18, thereby likewise inhibiting the production of spurious signals indicating the detection of riding or mounting.

The assembled condition of the indicator means 12 is shown in FIGS. 2 and 3. In FIG. 2 the signalling element 18 is shown in its cocked position with the end edge 56 of the signalling element located under the lip 58 of strap 54 so that when downward pressure is applied to actuator means 20, and an endwise thrust applied to waist portion 28 and thus to signalling element 18, in the direction of arrow T, the edge 56 becomes disengaged from lip 58 and signalling element 18 springs upward in the direction indicated by arrow S in FIG. 3 by virtue of the resilient action of hinge 30.

In FIG. 3 there is shown the tongue 40 which, in the assembled condition of the device is bent back to the FIG. 3 position so that it overlies waist portion 28 of indicator portion 24 of indicator means 12, so as thereby to exert an additional frictional resistance to movement of the signalling element 18 is the direction T, thereby further to inhibit the generation of spurious indicator signals. Alternatively this tongue could be bonded or formed on the underside of loop 54, for example in A-shaped form.

It may be provided that the surfaces of signalling element 18 which are exposed in its FIG. 3 position by its upward pivotal movement in the direction indicated by arrow S in FIG. 3 exposes readily visually-observed coloured portions on the surfaces 60 on the rear side of the signalling element.

Figure 4:
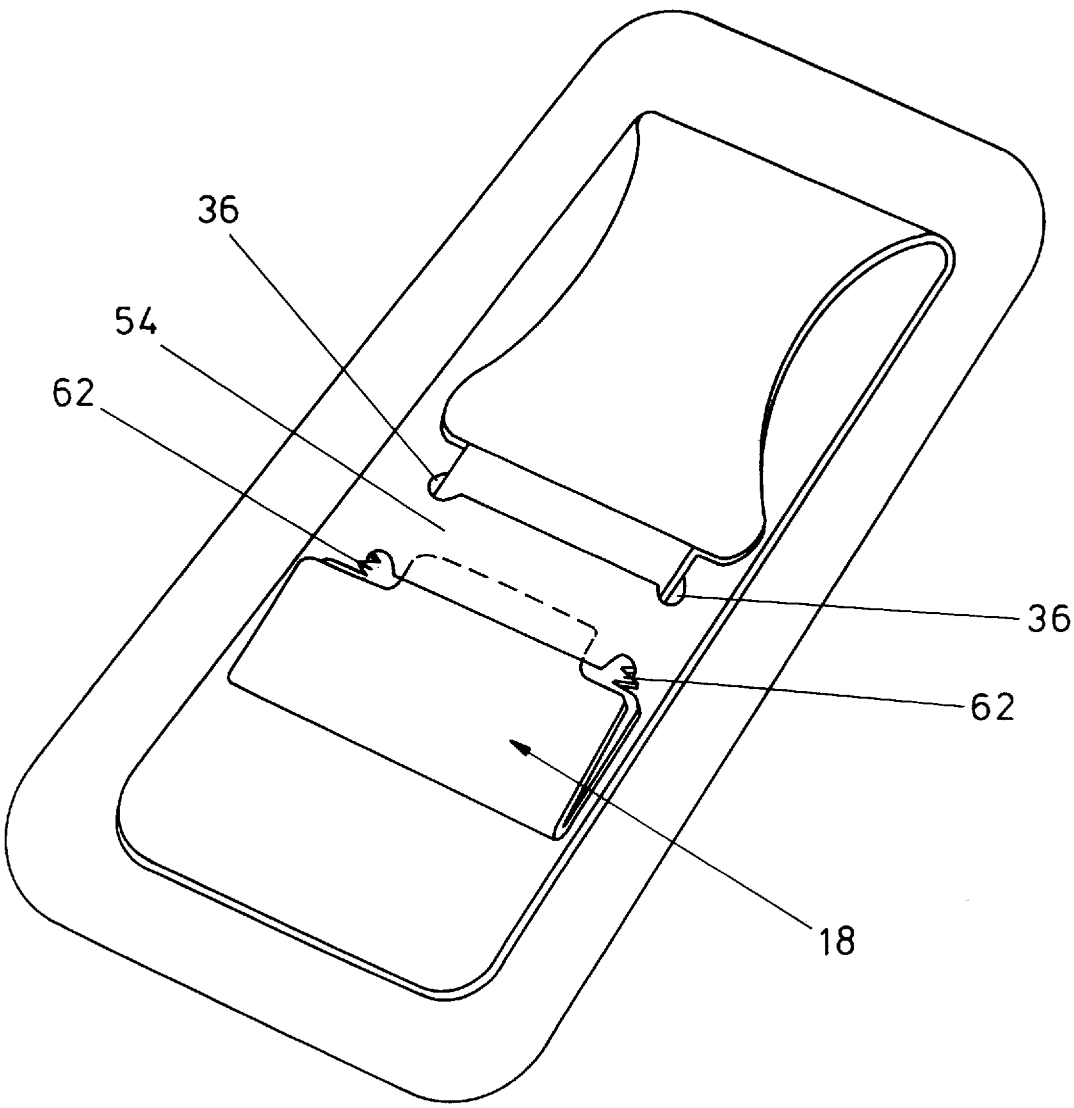
FIGS. 4 and 5 show, in views corresponding to those of FIGS. 2 and 3, a further embodiment in which alternative means is provided for inhibiting spurious actuation of the device.
Figure 5:
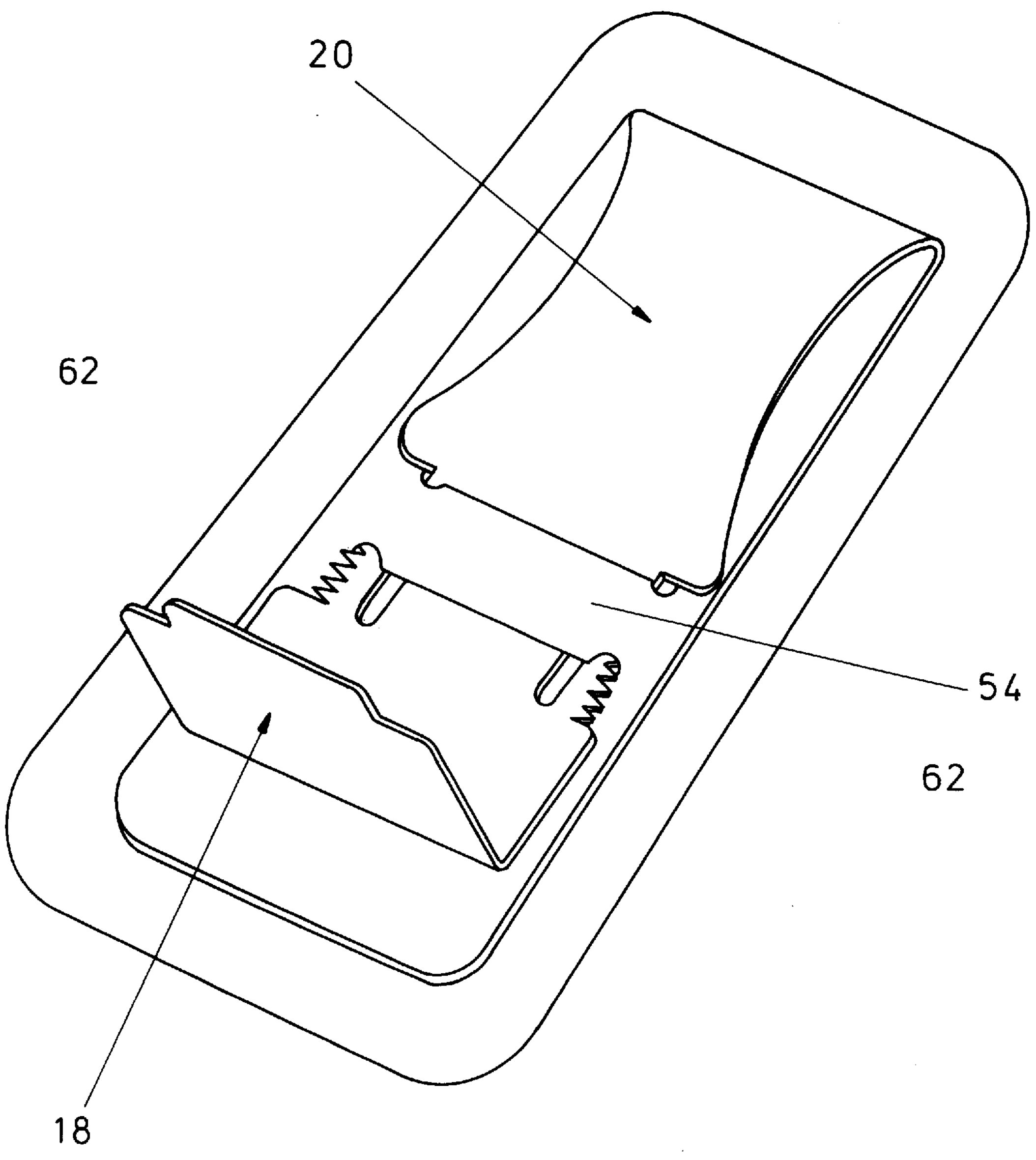

FIGS. 4 and 5 illustrate an alternative embodiment in which, in place of the ramps 46, 48 provided in the first embodiment there are provided rows of teeth 62 for frictional engagement with strap 54 and the edges of end openings 36 of slots 32, 34, thereby to provide modified frictional resistance characteristics so as to inhibit unwanted generation of riding detection signals.

Otherwise, this embodiment is constructed and arranged as described and illustrated above in relation to the embodiment of FIGS. 1 to 3, apart from some minor differences of profile. Therefore, no further description of this embodiment is deemed necessary. In this embodiment, the same reference numerals are adopted as in the embodiment of FIGS. 1 to 3, except in relation to the differences described above.

Figure 6:
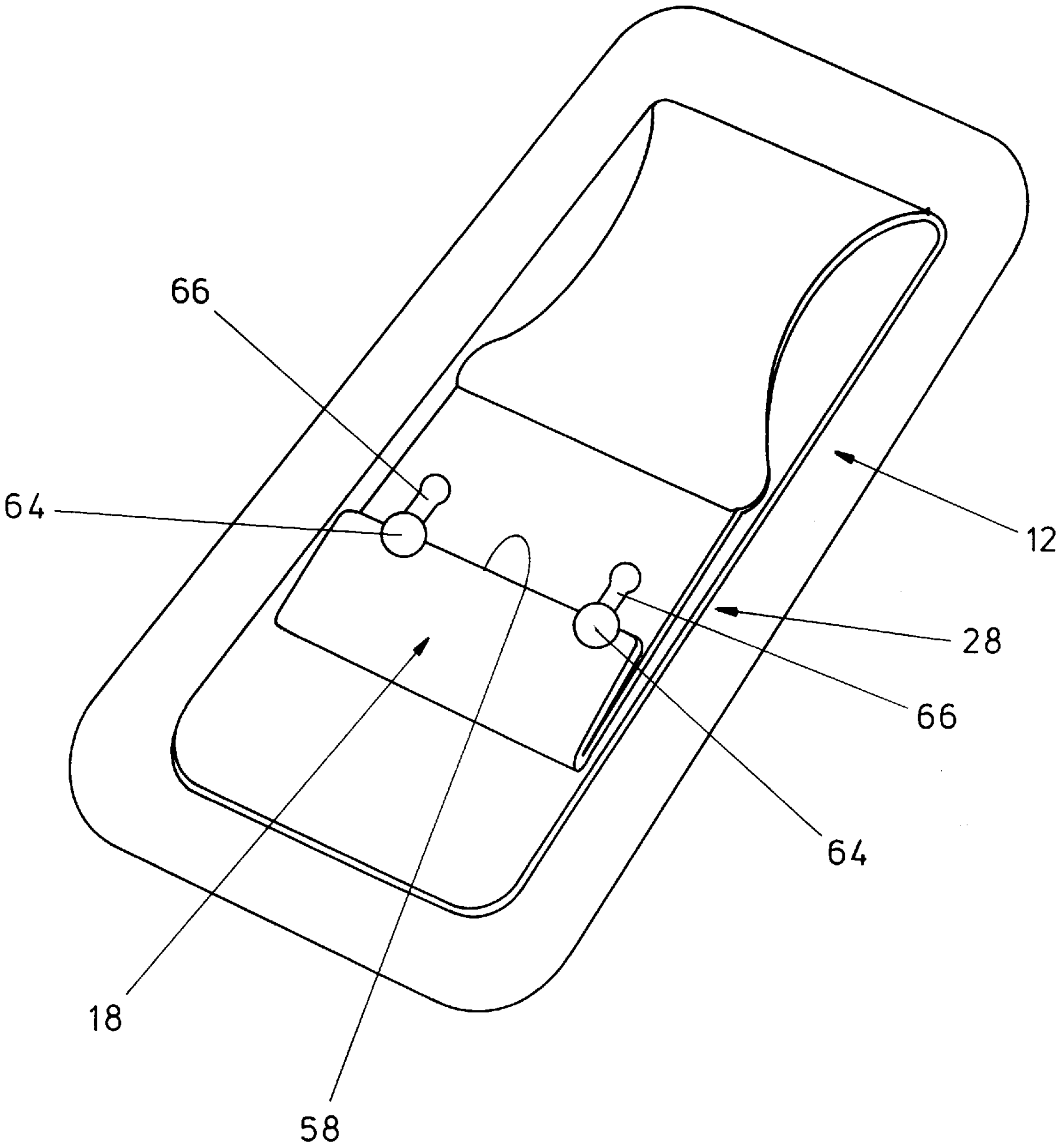
FIGS. 6 and 7 likewise correspond to FIGS. 4 and 5 and illustrate a still further embodiment incorporating further alternative means for inhibiting spurious actuation.
Figure 7:
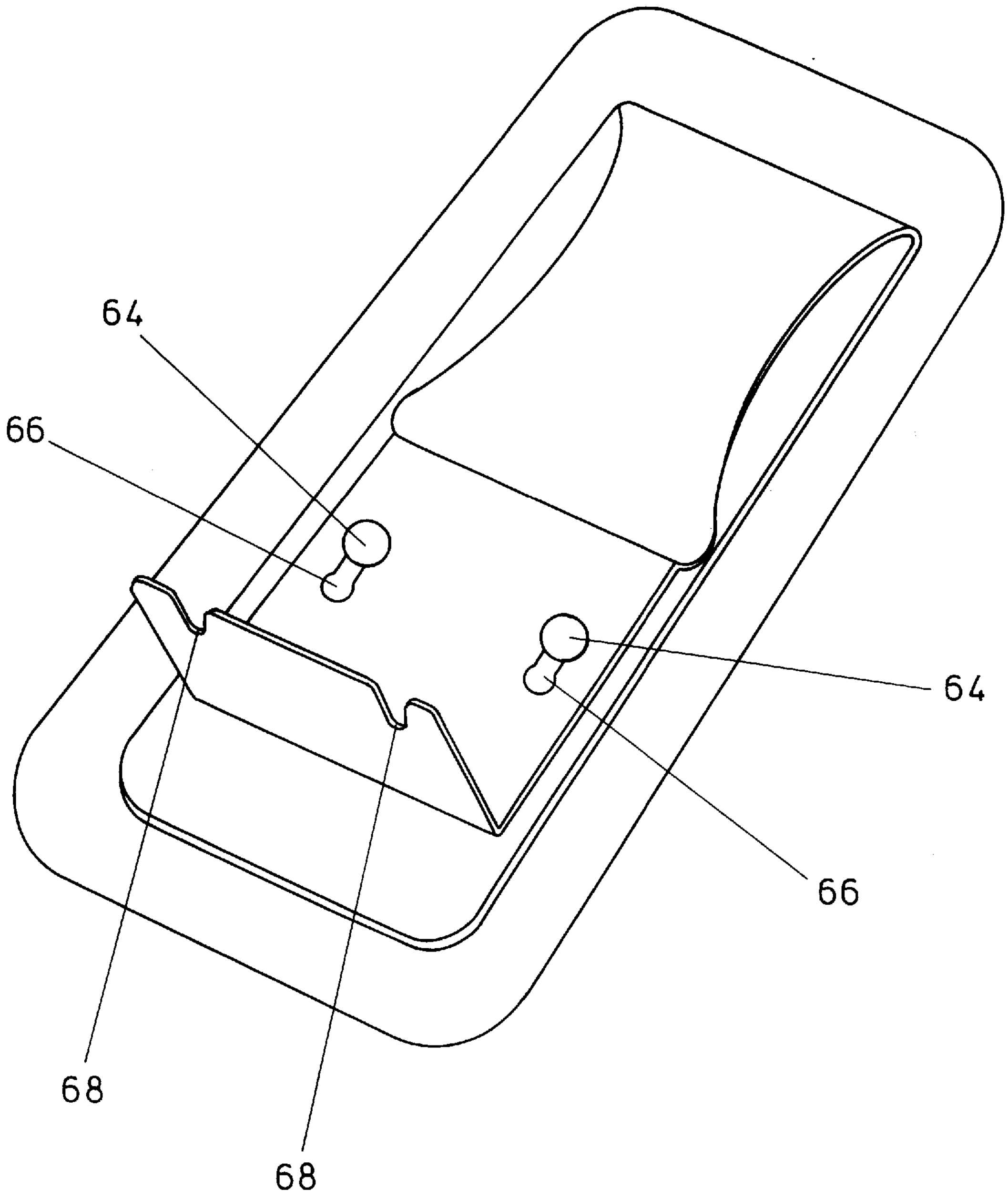

Likewise, in the embodiment of FIGS. 6 and 7, the general construction and arrangement and mode of operation is as already described in relation to the two preceding embodiments. However, in this embodiment, the indicator means is provided with a modified system for frictionally resisting movement of the signalling element 18 and thus for inhibiting the generation of spurious riding detection signals.

Thus, in this embodiment, there are provided fasteners in the form of rivets 64 received in slots 66 formed in waist portion 28.

Friction between the heads of rivet 64 and waist portion 28 serves to prevent such spurious actuation of the device. The heads of the rivets also serve to provide a means for lodging the lip 58 of signalling element 18, the lip being provided with recesses 68 to permit sufficient entry of the lip under the rivet heads.

In use, this embodiment operates substantially as described above. The embodiment of FIGS. 8 and 9 differs from the preceding embodiments in that, in place of a signalling element 18 connected by a hinge 30 to the waist or connector portion 28 of the device, there is provided an alternative arrangement in which a signalling element 70 is directly connected to actuator means 20 for actuation thereby. Signalling element 70 is formed with windows or apertures 72 providing means whereby signalling colours 74 provided on base portion 22 of the indicator means become exposed for a purpose to be described.

Figure 8:
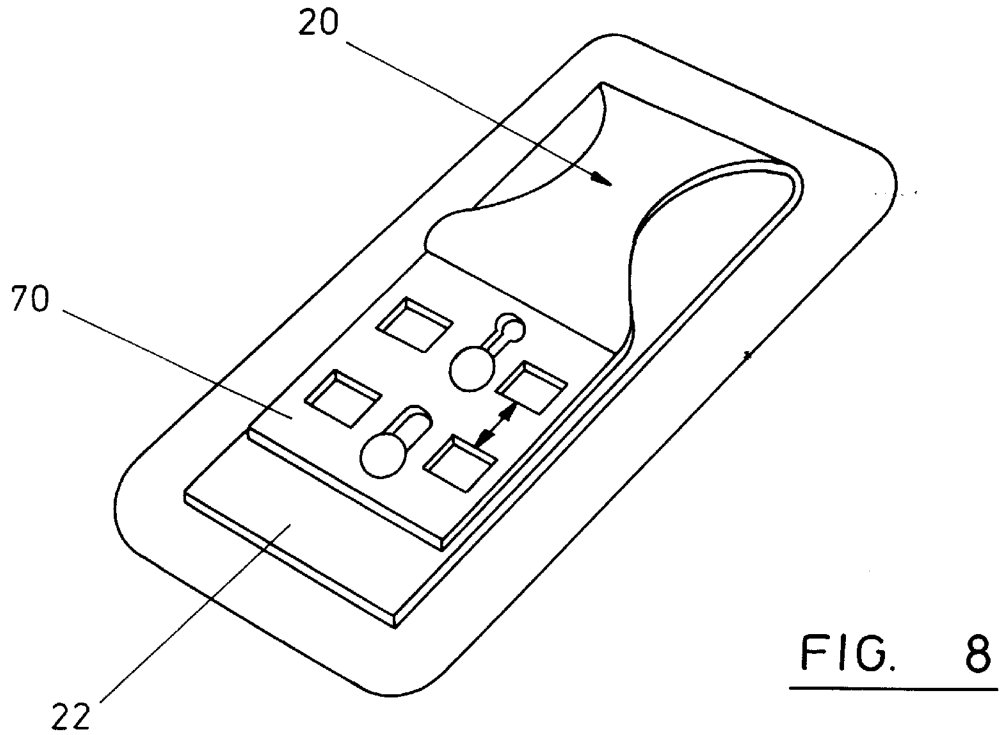
FIGS. 8 and 9 show a further embodiment in which alternative signalling means is provided.
Figure 9:
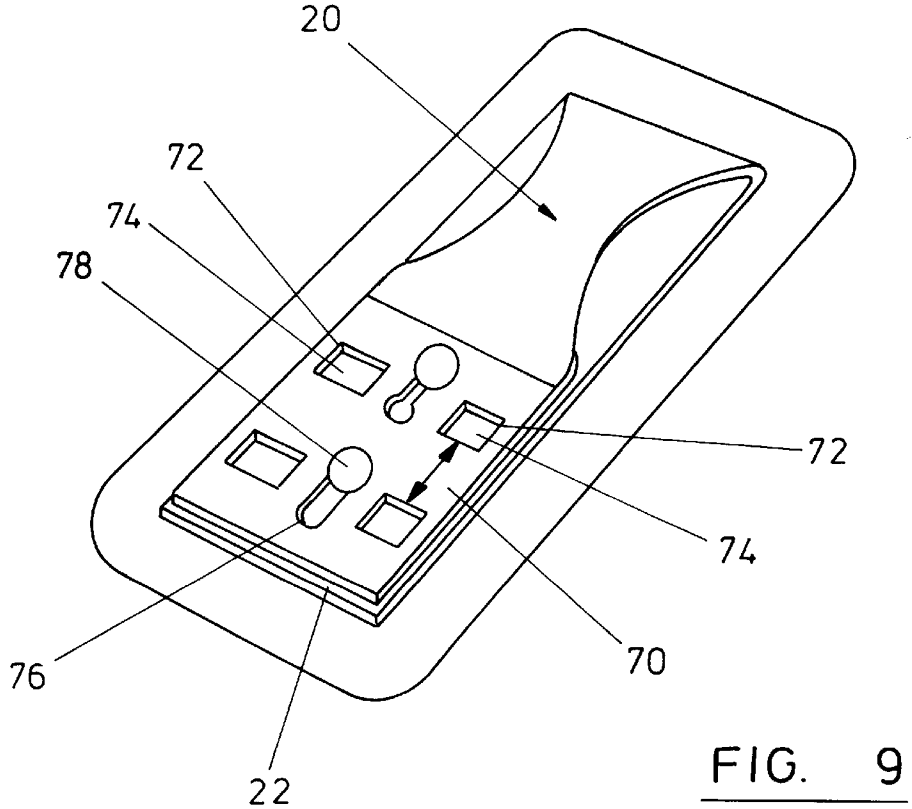

Signalling element 70 is formed with slots 76 and associated rivets 78 whereby back and forth motion of the signalling element against the frictional resistance provided by the heads of the rivets is permitted in the directions indicated in FIGS. 8 and 9 by the arrow heads. This latter feature is substantially as described above in relation to the embodiment of FIGS. 6 and 7.

FIG. 8 shows the device in its unactuated condition. FIG. 9 shows it after riding or mounting has been detected and indicated. For this purpose, the arrangement is such that an appropriate signalling colour 74 is exposed in windows 72.

Figure 10:
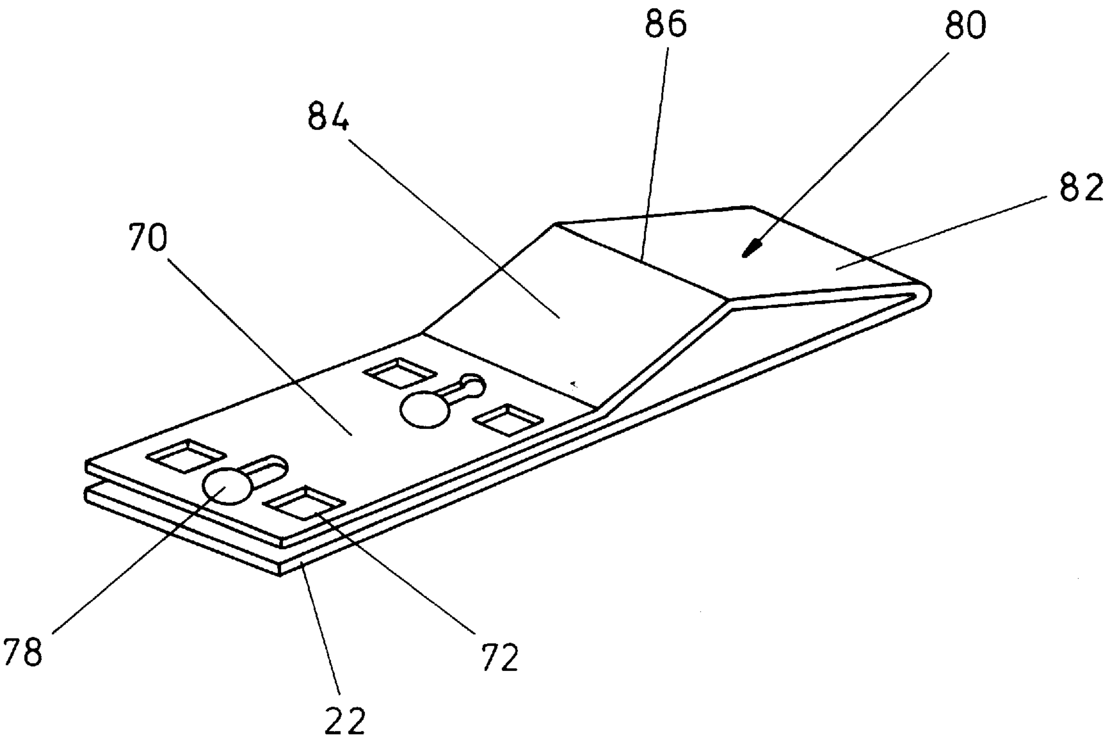
FIG. 10 shows a further embodiment incorporating alternative detector/actuation means responsive to pressure upon mounting or riding occurring.

In the embodiment of FIG. 10, the arrangement is otherwise as described above in relation to FIGS. 8 and 9, but an alternative to the smoothly curved actuation means 20 is provided in the form of a hinged actuator 80 having relatively stiff actuator portions 82, 84 interconnected by a hinge 86. The actuator 80 is constructed of the same flexible sheet material as in the previous embodiments.

Figure 11:
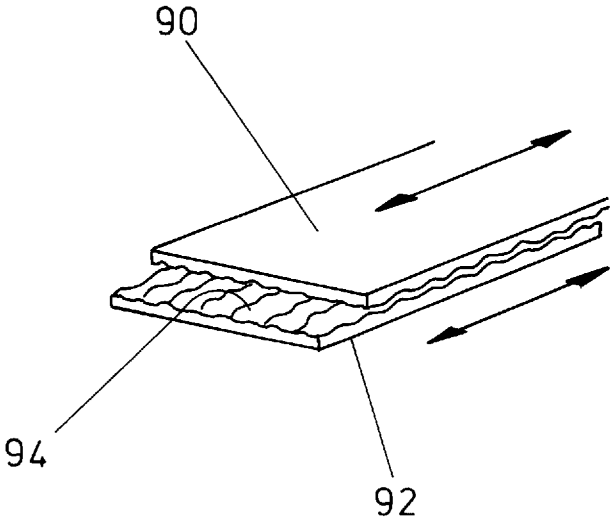
FIG. 11 shows a perspective view illustrating alternative resistance means for inhibiting spurious actuation of the device.

In the embodiment of FIG. 11 there is illustrated an arrangement whereby enhanced frictional resistance is provided between appropriate portions of indicator means according to the invention.

Thus, as shown in FIG. 11, sliding portions 90, 92 of the device are provided with roughened surfaces 94 in face-to-face contact whereby a relatively high level of frictional resistance is provided therebetween.

This arrangement can be provided at any suitable location in the embodiments of the preceding figures. Thus, for example, this frictional resistance could be provided between signalling element 70 and base 22 in the embodiments of FIGS. 6 to 10, thereby adding to or substituting for the frictional resistance provided by the heads of the rivets 64, 78. The arrangement could likewise be adopted in the embodiments of FIGS. 1 to 5 at appropriate locations on the sliding surfaces, thereby to inhibit the production of spurious riding detection signals.

Figure 12:
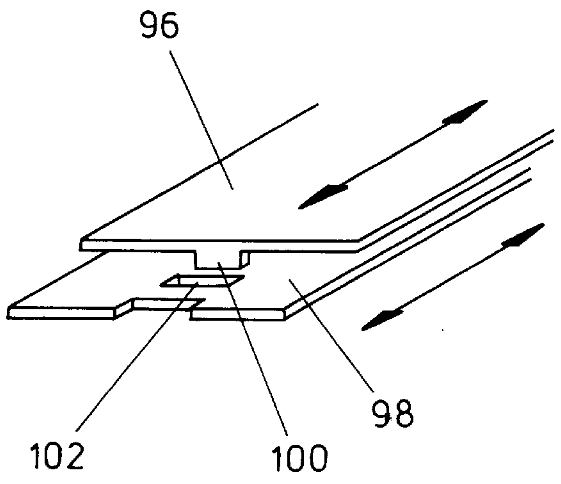
FIGS. 12 and 13 show perspective views illustrating further alternative means for inhibiting spurious actuation of the device.
Figure 13:
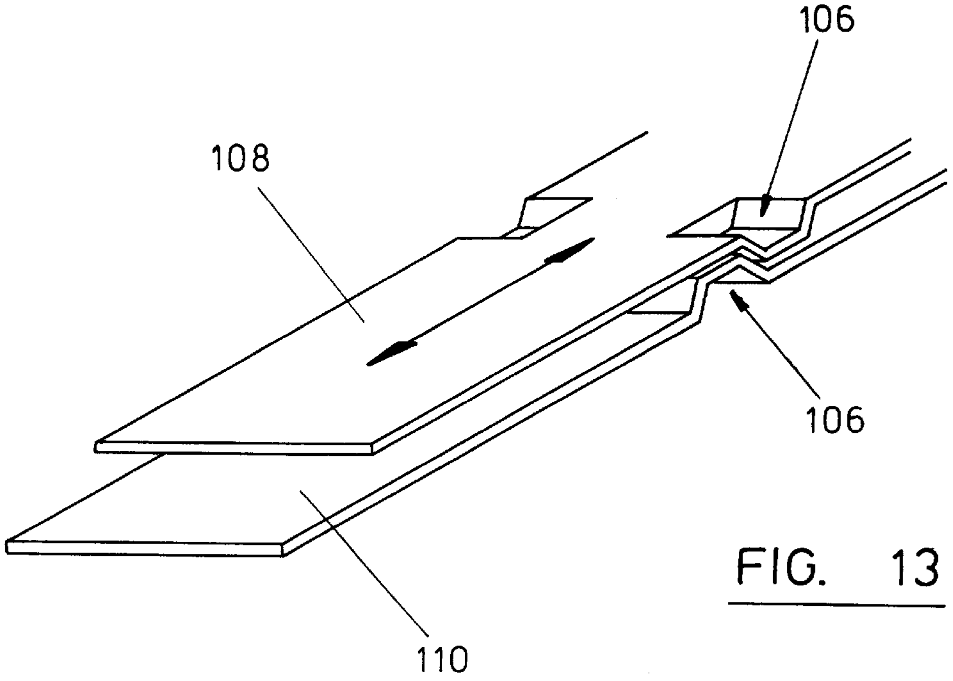

The embodiments of FIGS. 12 and 13 illustrate further alternative or supplemental arrangements for damping or otherwise frictionally resisting sliding movement of the signalling portions of embodiments of the invention. Thus, in the embodiment of FIG. 12 the slidable portions 96, 98 are formed, respectively, with a projecting peg or tooth 100 provided on portion 96 and to be received in a series of corresponding recesses 102 formed in sliding portion 98. The peg or tooth 100 is of flexible construction and can be caused to deflect and disengage from one recess or aperture and move to the next one, upon application of sufficient force.

As in the case of the embodiment of FIG. 11, this arrangement provides a degree of damping of the relative sliding movement of the portions 96 and 98, which can be utilised to inhibit the generation of spurious or unwanted riding detection signals.

In the arrangement of FIG. 13, in place of the peg 100 and recesses 102 there is provided an arrangement comprising pairs of complementary recesses 104, 106 which mutually engage and inhibit relative sliding motion between the parts 108, 110, while nevertheless permitting such movement to occur upon application of sufficient lengthwise-directed force therebetween. The mode and location of use of the embodiments of FIGS. 12 and 13 corresponds with that of the embodiment of FIG. 11.

Figure 14:
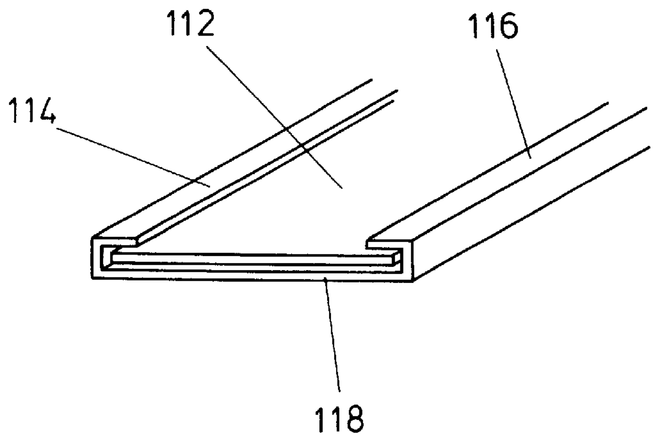
FIG. 14 shows an alternative guide for the signalling element and associated structures.

FIG. 14 shows an alternative arrangement for guiding the relative lengthwise longitudinal motion of the slidable portions of the embodiments of the invention which could be used in place of the guide provided by strap 54, or as a supplement thereto. In the embodiment of FIG. 14, sliding portion 112 is received in inwardly-projecting flanges 114, 116 formed on the other sliding portion 118, which permits some simplification of the structure of the preceding embodiments.

Amongst other modifications which could be made in the above embodiments while remaining within the scope of the invention are the following. Firstly, whereas the indicating means of the above embodiments is constructed substantially entirely of flexible plastics material, for example medical grade plastic sheet, and this represents an extremely economical form of the invention, it can be envisaged that alternative arrangements for detecting and signalling the detection of riding or mounting could be provided. Thus, for example, in place of the detector means 16 and actuator means 20 there could be provided comparable alternative devices such as a correspondingly-sized fluid-containing envelope capable of generating fluid pressure when actuated, so as to operate a pressure-responsive device to move a signal element. Alternative signalling means might be provided in place of the purely mechanical system of the embodiments, including the use of remotely monitorable devices capable of providing an electronic or electromagnetic signal using semi conductor and/or integrated circuit techniques.

As regards damping the device against the generation of unwanted or spurious detection signals, a variety of damping systems alternative to those specifically disclosed could be provided, though frictional damping as described above is believed to be likely to be the most cost effective.

Amongst other significant features of the embodiments are the following. Firstly, the indicator portion 24 of apparatus 10 of FIG. 1 is adapted to move in an indicating direction or along an indicating axis, back-and-forth under strap 54 when riding occurs. In this way, the apparatus 10 has a directional operating characteristic. Accordingly, the apparatus is mounted in use with the axis of movement (see arrow T in FIG. 2) generally aligned with the direction of relative movement between the animals when riding occurs, or indeed with the fore/aft axis of the female animal, thereby to inhibit the generation of spurious responses when the female animal engages another animal accidentally or otherwise, for example in a sideways-directed manner. In practice, the apparatus is mounted between the pin bones of a cow, which further serves to inhibit such generation of spurious responses. More generally, the apparatus is mounted on the rear portion of the female animal and where it will be located between it and the mounting animal but preferably not in a location where it will or can be triggered by accidental engagement with other animals or with stock enclosures, or otherwise. The apparatus is, of course, always mounted so that the direction of movement T as seen in FIG. 2 is directed generally forwardly and/or upwardly of the animal. The ability of the apparatus to not respond to sideways-directed forces provides it with significant advantages in the operating environment.

With reference to FIGS. 1 and 3 of the drawings, the tongue 40 on strap 54 not only serves to increase friction in relation to sliding movement of the indicator portion 24 in use, it also serves to lift the strap 54, thereby assisting re-setting of the device.

What is claimed is:

1. An apparatus for indicating when a female stock animal has been ridden by another stock animal adapted to be removably mounted on said female animal, the apparatus comprising:

a) indicator means;

b) said indicator means being adapted to be mounted on said female stock animal at a location where it will be directly engaged by the other stock animal during riding or mounting;

c) said indicator means being also adapted to respond to such mounting or riding;

d) said indicator means responding to said riding or mounting by exhibiting or producing an observable response; and e) said indicator means being adapted to be reset to its condition prior to such riding or mounting, whereby the apparatus can be reused;

wherein said indicator means comprises detector means for producing a visible signal by means of a mechanical signaling element which is actuated by the detector means and is movable to a signaling position and which detector means is responsive to pressure or compression or force or load or thrust applied thereto during such riding or mounting, and wherein the detector means and the mechanical signaling element comprise the same piece of flexible sheet material.

2. The apparatus according to claim 1 characterized by said detector means comprising an actuator which is movable to a raised position in which, in use, it is subjected to said pressure or compression or force or load or thrust and is caused to actuate said mechanical signalling element.

3. The apparatus according to claim 2 characterized by said actuator having a smoothly curved profile in said raised position and, in use, is positioned to be physically engaged by said other animal so as to be pressed towards a lowered position thereby to actuate said mechanical signalling element.

4. The apparatus according to claim 3 characterized in that said actuator comprises a flexible element having stiffness whereby said flexible element can generate thrust to actuate said signalling element.

5. The apparatus according to claim 4 characterized by said signalling element being directly connected to said actuator and said signalling element being movable to a signalling position by resilient means.

6. The apparatus according to claim 5 characterized in that said resilient means is provided by a hinge connecting said signalling element to its adjacent structure.

7. The apparatus according to claim 6 characterized in that said signalling element comprises a sheet of flexible but semi-stiff sheet material formed integrally with said hinge.

8. Apparatus according to claim 1 characterized in that said signalling is adapted to be retained in a non-signalling position in a ready-to-be-actuated condition of the indicator means by a retaining member, and actuation of the signalling element releases it from said retaining member.

9. The apparatus according to claim 7 characterized in that said signalling is adapted to be retained in a non-signalling position in a ready-to-be-actuated condition of the indicator means by a retaining member, and actuation of the signalling element releases it from said retaining member.

10. The apparatus according to claim 8 characterized in that said retaining member is in the form of a raisable portion of a base member of said indicator means.

11. The apparatus according to claim 9 characterized in that said retaining member is in the form of a raisable portion of a base member of said indicator means.

12. The apparatus according to claim 10 characterized in that said signalling element is arranged so that once released it cannot be returned to its retained position by tension applied to it by repeated actuation of the indicator means.

13. The apparatus according to claim 11 characterized in that said signalling element is arranged so that once released it cannot be returned to its retained position by tension applied to it by repeated actuation of the indicator means.

14. The apparatus according to claim 13 characterized by stop means to define limit positions for said actuator in which said signalling element is respectively retained and released.

15. The apparatus according to claim 13 characterized by discriminator means adapted to inhibit spurious actuation of said signalling element.

16. The apparatus according to claim 15 characterized in that said discriminator means comprise resistance or friction elements to inhibit or resist actuation of said signalling element.

* * * * *